United States Patent [19]

Yasuda

[11] 4,037,064

[45] July 19, 1977

[54] STEREO MICROPHONE APPARATUS

[75] Inventor: Hiroshi Yasuda, Yokohama, Japan

[73] Assignee: Sony Corporation, Tokyo, Japan

[21] Appl. No.: 625,453

[22] Filed: Oct. 23, 1975

[30] Foreign Application Priority Data

Oct. 31, 1974 Japan ................................ 49-125871
Nov. 1, 1974 Japan ................................ 49-126311

[51] Int. Cl.$^2$ .......................... H04M 1/05; H04R 5/00

[52] U.S. Cl. ................................ 179/156 R; 179/178; 179/1 G

[58] Field of Search .............. 179/1 G, 156 R, 146 R, 179/147, 187, 178

[56] References Cited

U.S. PATENT DOCUMENTS

| | | | |
|---|---|---|---|
| 2,643,729 | 6/1953 | McCracken | 179/187 X |
| 3,027,423 | 3/1962 | Reinthaler | 179/146 R X |

*Primary Examiner*—William C. Cooper
*Attorney, Agent, or Firm*—Hill, Gross, Simpson, Van Santen, Steadman, Chiara & Simpson

[57] ABSTRACT

A stereo microphone apparatus is provided which includes a pair of microphone units carried on a headband at opposite ends thereof. The apparatus further includes a pair of windscreens for covering the microphone units, respectively, each of which being capable of housing a human or dummy pinna.

15 Claims, 14 Drawing Figures

STEREO MICROPHONE APPARATUS

BACKGROUND OF THE INVENTION

1. Field of the Invention

The present invention relates mainly to a stereo microphone apparatus and particularly to a stereo microphone apparatus for binaural sound pickup used in dummy head recording or the like.

2. Description of the Prior Art

Acoustic reproducing systems have hitherto, been variously changed from a monaural system to a stereo system, to a 4-channel system and even further to a multi-channel system for the purpose of providing more faithful acoustic reproduction of the original sound field. To attain this end, not only one microphone but also a number of microphones have been used to establish a multi-microphone system in which the outputs thereof are properly mixed and transmitted through a number of channels.

In these systems, however, the original sound field has to be reproduced in, for example, the listening room of a listener, and this listening room must be wide to some extent. It is noted, on the other hand, that based upon the fact that we generally use our ears to recognize the direction from which sound signals arrive and the distance from the sound sources whether they are in front or back, right or left, or upper or lower directions, it is conceived that the necessary and sufficient information transmission can be attained by producing acoustic information signals which correspond to what the two ears of a listener in the original sound field would have actually listened to. According to this idea, only a transmission system is required by which the acoustic information provided in the eardrums of the listener in the original sound field is again produced in the eardrums of the listener in the reproducing room. In this case, the reproducing room can be selected quite freely. Besides, it is sufficient if the transmission system has two channels. Such a two-channel system is very low in cost and the reproduction of acoustic information, as good as the conventional multi-channel system, becomes possible.

It is understood that experiments of a binaural stereo system along the aforesaid lines were carried out in the year 1930 by the Bell Telephone Laboratories. In this case, satisfactory reliable results were achieved on account of the performance of sound pickup microphones, reproducing headphones and the like. The term "pinna" as used herein, is the largely cartilogenous projecting portion of the external ear.

Accordingly, there has been proposed a microphone apparatus suitable for sound pickup to satisfy the above condition. A prior art stereo microphone apparatus of this kind has a dummy head normally made of silicon rubber or the like and has a pair of symmetric microphone units, each mounted at the position of the inlet to auditory canal of a dummy head or eardrum thereof. This microphone apparatus is designed so that a condition from a sound source to the inlet of the microphone may become close to the condition of actual human ears. However, since the size of the microphone apparatus is fixed and constant, if there is a difference between the shape and size of the dummy head and those of a listener's head, it is not always possible to achieve good results. In addition, microphone apparatus of the aforesaid type is high in cost, and it is also large in size and heavy in weight, with the result that transportation of the same is inconvenient.

In order to eliminate the aforesaid drawbacks, it has been proposed that the following microphone apparatus be used; namely, that the microphone apparatus comprise an arc-shaped resilient pipe, a pair of microphone units attached to the opposite ends of the pipe, and supporting members on which are mounted the pair of microphone units. Each of the supporting members serves to cause the sound inlet of microphone to be positioned near the orifice of the auditory canal. An output cord is led out from the center of the resilient pipe, and the microphone apparatus is formed in the shape of a stethoscope.

This microphone apparatus is normally used in such a manner that it is directly mounted on the human ears or located on a dummy head having no microphone. This microphone apparatus greatly improves the above mentioned defects, but still has the drawbacks such that it easily picks up a wind noise and a code contact noise and is low in stability when it is mounted on human ears.

SUMMARY OF THE INVENTION

It is an object of this invention to provide a novel and superior stereo microphone apparatus free from the prior art drawbacks.

Another object of this invention is to provide a stereo microphone apparatus comprising a pair of cup-shaped windscreens each having a shape and size capable of housing a pinna, a pair of microphone units, and a headband attached to the pair of cup-shaped windscreens, in such a manner that the pair of microphone units are respectively mounted in the pair of cup-shaped windscreens. Upon being used, each of the microphones may thus be positioned in the vicinity of the inlet of the auditory canal of the pinna.

Another object of this invention is to provide a stereo microphone apparatus capable of performing stable binaural sound pickup simulating a condition of being located on a human head or a dummy head in the same manner that a human being would hear the sound if he were hearing the sound at the same position as the pickup.

Another object of this invention is to provide a stereo microphone apparatus for binaural sound pickup which is provided with windscreens to prevent a wind noise and a cord noise from being easily picked up.

Another object of this invention is to provide a stereo microphone apparatus for binaural sound pickup which is compact and convenient for transportation.

Another object of this invention is to provide a stereo microphone apparatus for binaural sound pickup which provides dummy pinnas within the windscreens or in association with the windscreens thereby to exhibit constant sound pickup characteristic with less individual difference.

Another object of this invention is to provide a stereo microphone apparatus in which dummy pinnas are formed integrally with the windscreens so that mass production is attainable.

Another object of this invention is to provide a stereo microphone apparatus suitable for sound pickup with a dummy head being included therein and convenient for transportation.

Another object of this invention is to provide a stereo microphone apparatus for binaural sound pickup which is capable of removing from a picked-up sound signal an information component for judging the direction of an acoustic information signal coming from an acoustic reproducing apparatus with an amplifier having a frequency characteristic compensating circuit being connected to the microphone unit.

Another object of this invention is to provide a stereo microphone apparatus for binaural sound pickup adapted to produce a sound signal which is also suitable for reproduction by a loudspeaker.

The other objects, features and advantages of this invention will be apparent from the following description taken in conjunction with the accompanying drawings.

DESCRIPTION OF THE PREFERRED EMBODIMENTS

A description will hereinafter be given on embodiments of a stereo microphone apparatus according to the invention with reference to the drawings.

Figure 1:
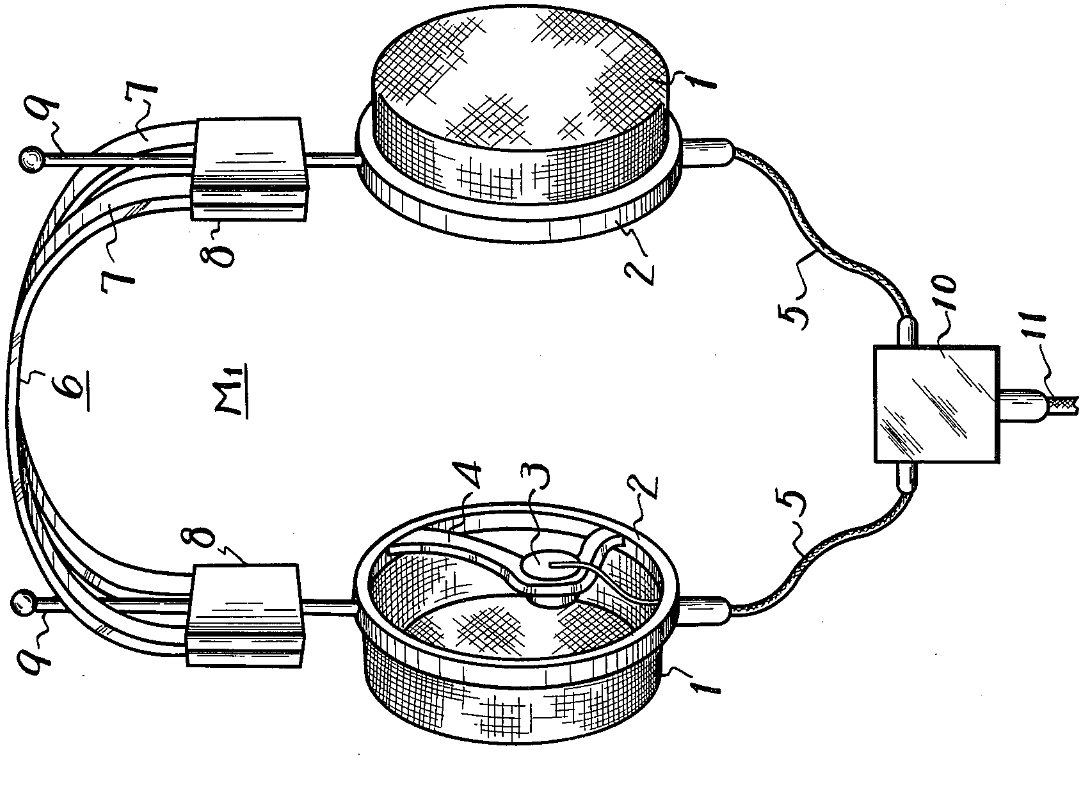
FIG. 1 is a perspective view showing one embodiment of a stereo microphone apparatus according to this invention.

The first embodiment of the invention as shown in FIG. 1, comprises a stereo microphone assembly $M_1$. This stereo microphone assembly $M_1$ is provided with a pair of cup-shaped windscreens 1, 1, each having a shape and size suitable for housing a pinna. The windscreen 1 is formed normally in a cup-shape such as a flat cylinder, an elliptic cylinder, a polygonal cylinder and the like by a wire net, plastic net, plastic porous member or the like. These windscreens 1, 1 are respectively attached to metallic or plastic ring-shaped frames 2, 2. A pair of nondirectional microphone units 3, 3 are respectively mounted to the frames 2, 2 through supporting members 4, 4 in the cup-shaped windscreens 1, 1 so that each of them may be positioned in the vicinity of an orifice of an auditory canal when the microphone assembly $M_1$ is located on a head. Cords 5, 5 are two cords which are let out from the microphone units 3, 3 and connected to another cord 11 through a stereo amplifier in an amplifier case 10. A headband member 6 consists of resilient bands 7, 7 made of metal, plastic or the like and metallic or plastic blocks 8, 8 attached to the end portions of the resilient bands 7, 7. The blocks 8, 8 are slidably attached to metal poles 9, 9, which are erected on the frames 2, 2. If this stereo microphone assembly $M_1$ is located on an operator's head, the microphone units 3, 3 are each positioned near the orifice of the auditory canal of the operator's pinna as described above, so that it is possible to record a sound substantially equal to that actually listened to by his own ears.

Another embodiment of this invention will next be described with reference to FIG. 2, in which elements corresponding to those in FIG. 1 are referred to by the same reference characters with the description thereof being omitted.

Figure 2:
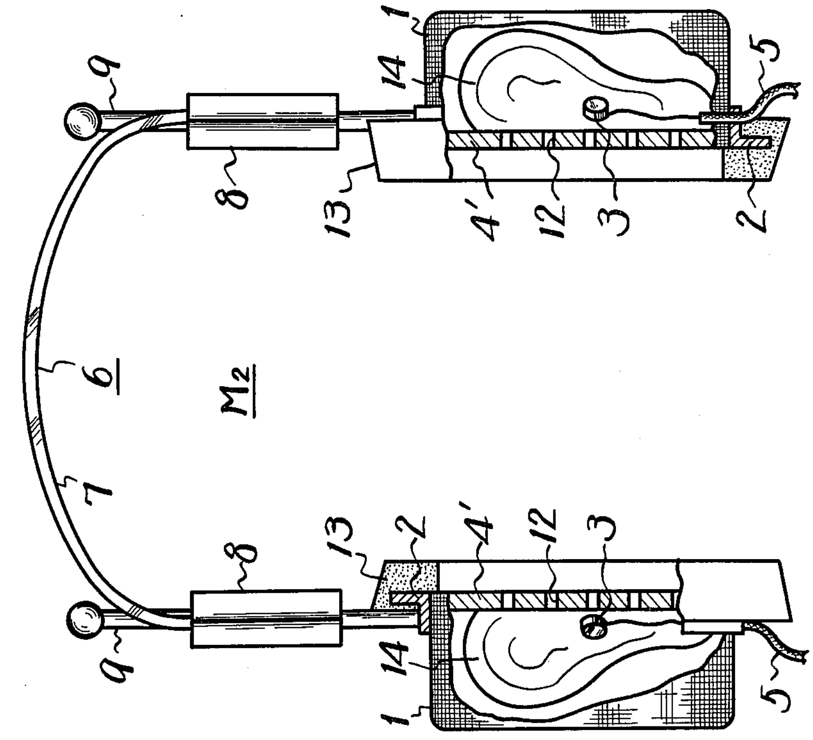
FIG. 2 is a front view, partially cut away, showing another embodiment of the stereo microphone apparatus according to this invention.

In FIG. 2, as a substitute for the supporting members 4, 4 of FIG. 1, discs 4', 4' made of, for example, plastics and having monitoring apertures 12, 12 are respectively attached to the ring-shaped frames 2, 2 so as to cover the opening portions of the cup-shaped windscreens 1, 1. Further, the discs 4', 4' are attached to dummy pinnas 14, 14. The dummy pinna 14 is formed in a shape similar to a human ear by, for example, plastics or silicone rubber and designed to have physical characteristics such as to exhibit an effect as close to a human ear as possible. The pair of nondirectional microphone units 3, 3 are mounted on the discs 4', 4' through shock absorbers (not shown), each in opposition to the inlet of the auditory canal of the dummy pinna 14. Further, ring-shaped cushion pads 13, 13 made of foamed plastics are provided around the frames 2, 2. In this case, the pinnas of the operator of this stereo microphone assembly $M_2$ are enveloped in the concave portions formed by the discs 4', 4', and the cushion pads 13, 13 and the binaural sound pickup is performed by utilizing the dummy pinnas 14, 14 in place of the actual pinnas in the embodiment of FIG. 1. Further, during sound pickup, the sound can also be monitored by the operator's ears through the apertures 12, 12 provided in the discs 4', 4'.

Another embodiment of this invention will now be described referring to FIGS. 3 and 4. In this embodiment, portions corresponding to the cup-shaped windscreens 1, 1 in FIG. 2 are halved into front and back portions, each front half being formed as a semicup-shaped windscreen 1', and each back half being formed as a semicup-shaped dummy pinna 14', having a concave portion 14''. Each microphone unit 3 is buried in a recess in the disc 4', substantially at its center covered by the windscreen 1' and the concave portion 14'' of the pinna 14'. In this case, since the windscreen 1', the ring-shaped frame 2, the disc 4', and the dummy pinna 14' can be properly combined to be integrally formed, the microphone assembly $M_3$ is also suitable for mass production.

Figure 3:
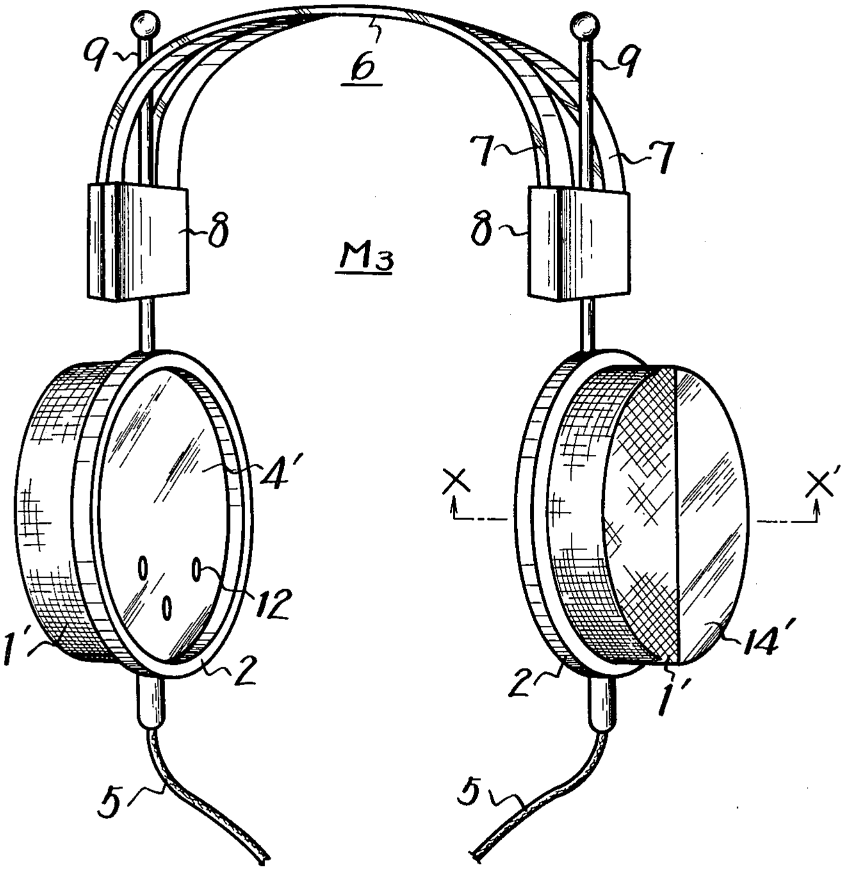
FIG. 3 is a perspective view showing a further embodiment of the stereo microphone apparatus according to this invention.
Figure 4:
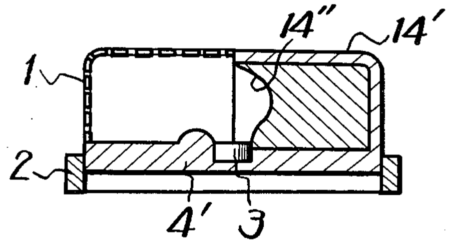
FIG. 4 is a cross-sectional view of the stereo microphone apparatus as seen in the direction of arrows from the line X—X' of FIG. 3.
Figure 5:
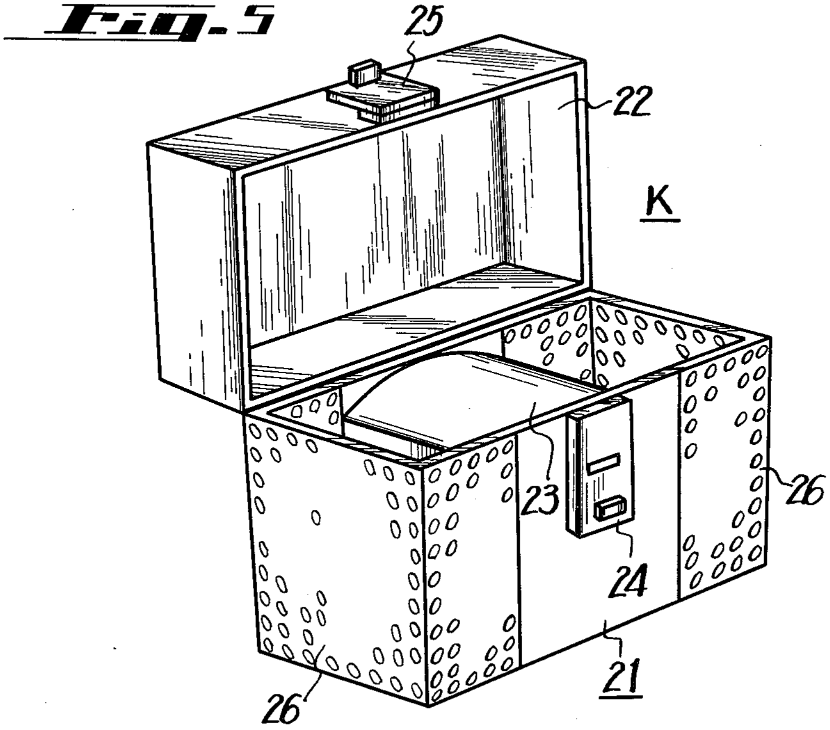
FIG. 5 is a perspective view showing one embodiment of a housing case of the stereo microphone apparatus shown in FIGS. 1, 2 and 3.

The stereo microphone assemblies shown in FIGS. 1, 2 and 3 may be located either on a human head or on a dummy head. When a human head is utilized, the sound pickup characteristics are different according to the shape of the head or ear. If the sound pickup requires a long time, the locating of the stereo microphone assembly on the head causes a pain or the excess movements of the head may result in unnatural sound pickup. Further, when a dummy head is utilized, the dummy head is large in size so that its transportation is difficult and also its appearance is not so pleasant. The present invention provides a housing case for housing the stereo microphone assembly M as mentioned above. FIG. 5 shows the housing case K as a whole. The housing case K is composed of a case body 21, a lid 22 and a dummy head 23 provided inside the case body 21. The case body 21 and the lid 22 are both generally cubic in shape and the lid 22 is hinged on the case body 21 at one edge thereof. Locking members 24 and 25 are respectively attached to the case body 21 and the lid 22.

Figure 6:
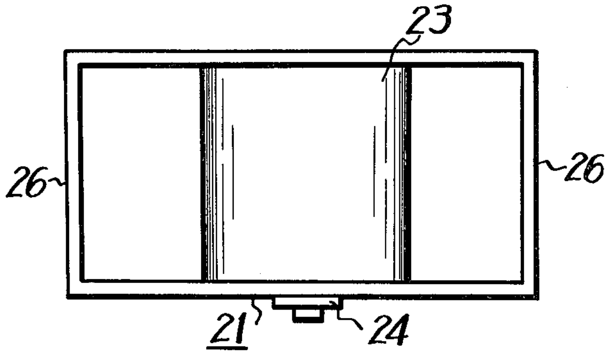
FIG. 6 is a plan view of the housing case shown in FIG. 5.

As depicted in FIG. 6, the dummy head 23 is formed substantially in a cubic shape as a whole with its upper end surface being made cylindrical. In this case, the lateral width of the dummy head 23 is preferred to be made substantially equal to the distance between both of the human ears. In addition, it is preferable that the dummy head 23 be made acoustically the same in characteristic as that of a human head. The dummy head 23 is normally disposed in the case body 21 at its center in close contacts with the front and rear side plates of the latter, as shown in FIGS. 5 and 6. The portions of the case body 21 corresponding to both sides of the dummy head 23 are designed to have porous covers 26 for sound pickup. Since the stereo microphone assembly received in the housing case K has the windscreens, holes of the covers 26 are desired to be larger than those of the windscreens.

Further, the case body 21 is provided with an opening at its rear plate for leading out therethrough the cord of the stereo microphone assembly, though not shown. In the case when the stereo microphone assembly as shown in FIGS. 1, 2 and 3 is received in the housing case K, the stereo microphone assembly is located on the dummy head 23 and the cord of the stereo microphone assembly is led out from the case body 21 before the lid 22 is closed.

Figure 9A:
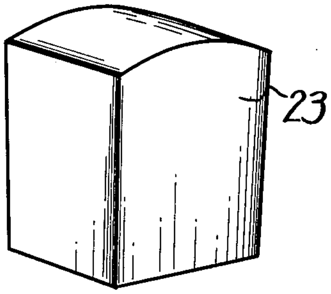
FIGS. 9A, 9B, 9C and 9D are perspective views respectively showing an embodiment of a dummy head which forms a part of the housing case shown in FIGS. 5 and 6.
Figure 9B:
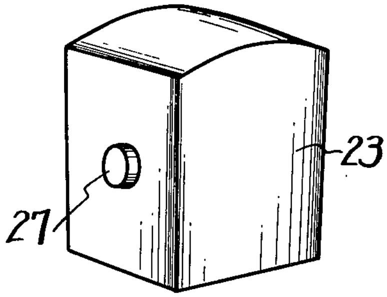
Figure 9C:
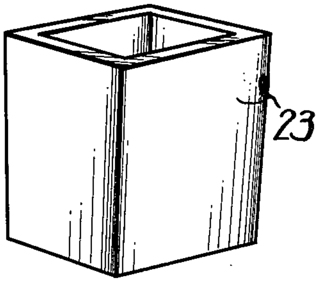
Figure 9D:
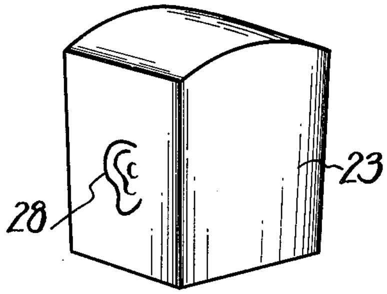

As shown in FIG. 9B, the dummy head 23 may be provided with projections 27 at its both sides for being engaged with the cushion pads 13, 13 used in the stereo microphone assemblies $M_2$ and $M_3$ of FIGS. 2 and 3. Also, as shown in FIG. 9C, the dummy head 23 can be formed in a box-shape in which the cord and the like of the stereo microphone system are housed. Further, the housing case K receiving the stereo microphone assembly with no dummy pinnas such as shown in FIG. 1 may be provided with the dummy head 23 having dummy pinnas 23 at its both sides as depicted in FIG. 9D. The aforesaid dummy pinnas 28 are preferably made of, for example, soft plastics or silicone rubber imitating a human pinna.

Figure 7:
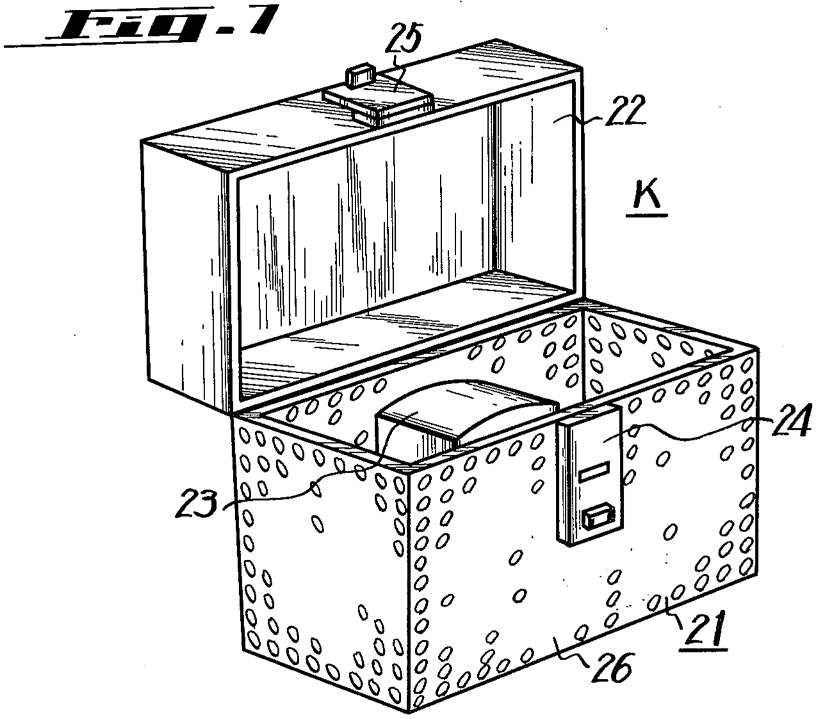
FIG. 7 is a perspective view showing another embodiment of the housing case similar to that of FIG. 5.
Figure 8:
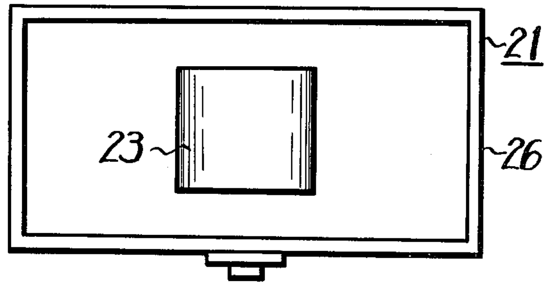
FIG. 8 is a plan view of the housing case shown in FIG. 7.

As depicted in FIGS. 7 and 8, the housing case K may have the sound pickup porous covers 26 provided at its whole peripheral surface except the portion where the locking member is equipped, and also the dummy head 23 may not contact with the inner surfaces of the case body 21. In this case, the dummy heads 23 shown in FIGS. 9A to 9D can also be used.

Figure 10:
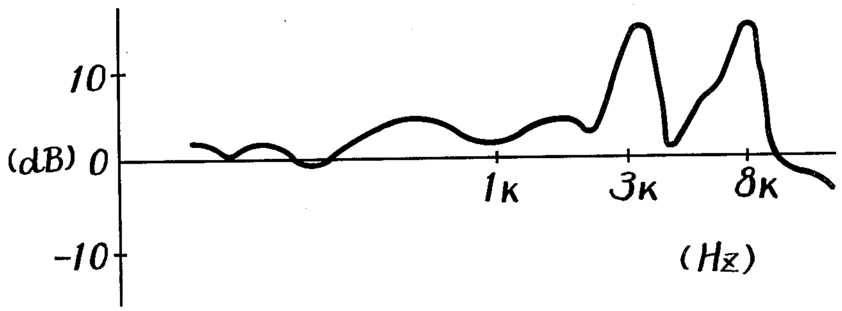
FIG. 10 is a curve showing frequency characteristic of binaural sound pickup.

As described above, with a binaural microphone apparatus comprising a pair of microphone units which are disposed near the opening of auditory canals of both human ears or disposed near the opening of auditory canals of dummy pinnas when a dummy head having dummy ears or pinnas is used, the frequency characteristic of a sound signal obtained from the above apparatus is normally not flat. A pair of microphone units disposed in the vicinity of the inlets of auditory canals of both human ears pick up a sound from a sound source located in the front thereof to produce a sound signal having such a frequency characteristic as shown in FIG. 10. In this frequency characteristic, there are two peak values in level at frequencies near 3 KHz and 8 KHz, but this frequency characteristic is varied according to individual difference. This frequency characteristic makes a contribution to recognition of the arrival direction and distance of an acoustic information source. In other words, the positional relation between a sound source and listener's ears equally corresponds with the variation of frequency characteristic. Therefore, the above corresponding relationship is required to be correctly reproduced in order to properly reproduce the original sound field. However, when this reproduction is carried out through a reproducing apparatus, not only the frequency characteristic of the reproducing apparatus but also its positional information, that is, frequency characteristic produced in ears by the positional relation between the reproducing apparatus and ears must be eliminated by compensation. In a case of using a normal headphone, the frequency characteristic as shown in FIG. 10 is positively utilized for avoiding localization at the back of the head upon reproducing a stereo acoustic signal picked up by the prior art stereo sound pickup system, so that this frequency characteristic is required to be removed by compensation. Further, when a sound signal by binaural sound pickup system is reproduced through loudspeakers, front localization information comes to be provided twice, so that the front localization information for a picked up sound signal is eliminated and hence the reproduced sound by loud speakers can be enjoyed under the same condition as that of the prior art stereo sound.

Figure 11:
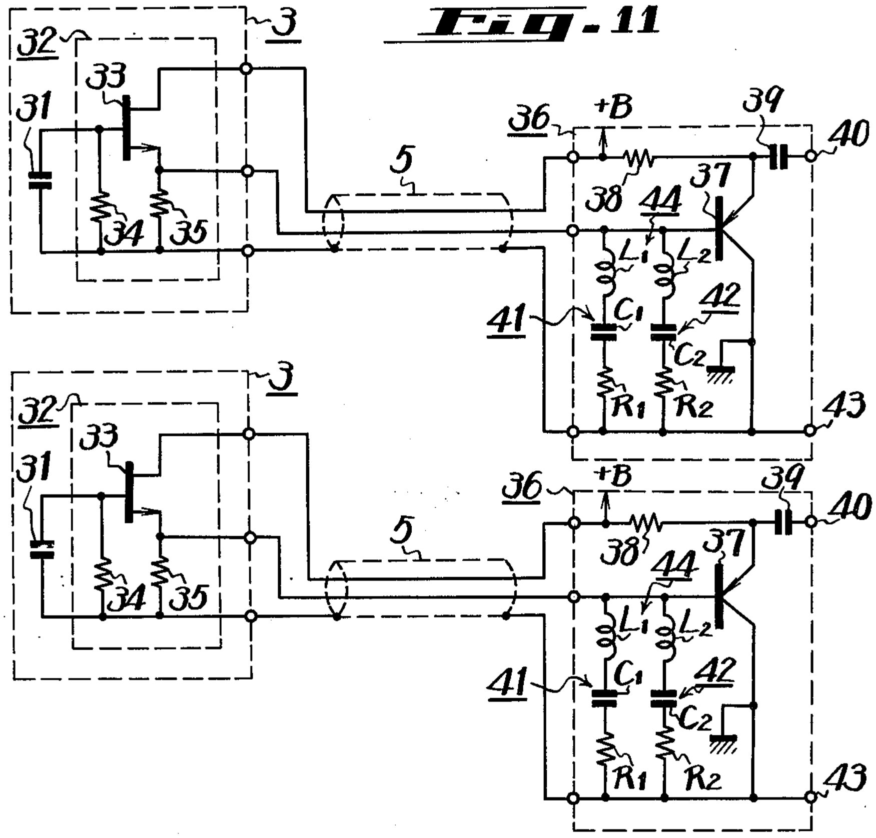
FIG. 11 is a circuit diagram showing one embodiment of microphone units and their amplifiers for use in the stereo microphone apparatus according to this invention.

Referring to FIG. 11, a description will next be given of the microphone units 3, 3 and binaural microphone amplifiers 36, 36, by which the above mentioned compensation is performed.

The microphone unit 3 consists of an electret condenser microphone capsule 31 and its pre-amplifier 32. The pre-amplifier 32 is composed of a field effect transistor 33, a resistor 34 connected in parallel with the capsule 31, and a load resistor 35 connected to the source electrode of the transistor 33. The amplifiers 36, 36 are each connected through the two-cord shielded cord 5 to the microphone unit 3. The amplifier 36 includes an amplifying transistor 37 the emitter electrode of which is connected through a load resistor 38 to a power supply source +B. The power supply source +B is connected through the cord 5 to the drain electrode of the transistor 33 in the pre-amplifier 32. The emitter electrode of the transistor 37 is further connected through a condenser 39 to an output terminal 40, while the base electrode of the transistor 37 is connected through the cord 5 to the source electrode of the transistor 33 in the pre-amplifier 32. The collector electrode of the transistor 37 is grounded and also connected to an output terminal 43 and the pre-amplifier 32.

Each of these amplifiers 36, 36 is provided with a frequency characteristic compensating circuit 44 by which the frequency characteristic of a sound signal derived from the binaural microphone assembly M is compensated to a flat characteristic. The frequency characteristic compensating circuit 44 consists of a first trap circuit 41 having a resonance frequency of, for example, 3 KHz and a second trap circuit 42 having a resonance frequency of 8 KHz, which are respectively connected between the base electrode of the transistor 37 and the ground. The first trap circuit 41 consists of a series resonance circuit of coil $L_1$, condenser $C_1$ and resistor $R_1$, and the second trap circuit 42 consists of a series resonance circuit of coil $L_2$, condenser $C_2$ and resistor $R_2$, respectively. The above described frequency characteristic is compensated for by these trap circuits 41 and 42 and hence the sound pickup suitable for the reproductions by a headphone and by loudspeakers can be achieved. Further, more faithful reproduction in response to an individual case can be achieved by slightly changing the central frequency of the resonance circuit.

It will be apparent that the above mentioned stereo microphone apparatus is not limited to the aforesaid embodiments, but a number of changes and variations can be effected without departing from the scope of this invention.

I claim as my invention:

1. A stereo microphone apparatus comprising:

a. a pair of microphone units;

b. windscreens covering each of said microphone units;

c. means for supporting said microphone units within said windscreens, respectively; and d. resilient means for connecting said windscreens a predetermined distance apart.

2. A stereo microphone apparatus as set forth in claim 1, wherein said windscreens are each formed in a cup-shape with openings which are disposed opposite to each other, said connecting means including means for mounting said microphone units in said openings of said cup-shaped windscreens on said supporting means.

3. A stereo microphone apparatus as set forth in claim 2, wherein said supporting means are respectively mounted on the cup-shaped windscreens so as to cover said openings thereof, and further said supporting means are each provided therethrough with an aperture.

4. A stereo microphone apparatus as set forth in claim 3, wherein a pair of dummy pinnas are mounted to said supporting means and covered by said windscreens, respectively, and wherein said microphone units are respectively mounted on said dummy pinnas.

5. A stereo microphone apparatus as set forth in claim 1, wherein a pair of dummy pinnas are provided within said windscreens, and wherein said microphone units are respectively mounted so as to be positioned within said dummy pinnas.

6. A stereo microphone apparatus as set forth in claim 5 wherein said windscreens are each formed in a cup-shape with openings which are disposed opposite to each other, said supporting means respectively mounted on the cup-shaped windscreens so as to cover said openings thereof, and said dummy pinnas being mounted on said supporting means.

7. A stereo microphone apparatus as set forth in claim 1, further comprising an amplifier having an active element for amplifying an output of each microphone unit, and wherein said amplifier includes a frequency characteristic compensating circuit for levelling the frequency characteristic of an output signal from said microphone unit.

8. A stereo microphone apparatus as set forth in claim 7, wherein said frequency characteristic compensating circuit is connected to said active element and composed of at least two trap circuits.

9. A stereo microphone apparatus comprising:

a. a pair of microphones;

b. a pair of mounting frames each carrying one of said microphones;

c. a supporting band on which said mounting frames are carried on the outer ends thereof;

d. each of said mounting frames including a cup-shaped windscreen in which said microphones are respectively mounted;

e. said cup-shaped windscreens having openings facing each other; and f. said supporting band being of such length and shape as to be adaptable to being placed on a dummy head having dummy pinnas simulating generally the shape and location of human pinnas on a human head;

g. said cup-shaped windscreens overlying said dummy pinnas.

10. A stereo microphone apparatus comprising:

a. a pair of microphone units;

b. a pair of covering means each consisting of a windscreen and supporting means; each of said windscreens covering said microphone unit, and each of said supporting means supporting said microphone unit within said windscreen; and c. resilient means for connecting said windscreens a predetermined distance apart.

11. A stereo microphone apparatus comprising:

a. a pair of microphones;

b. a pair of mounting frames, each carrying one of said microphones;

c. a supporting band on which said mounting frames are carried on the outer ends thereof;

d. each of said mounting frames including a cup-shaped windscreen in which said microphones are respectively mounted;

e. said cup-shaped windscreens having openings facing each other; and f. said supporting band being of such length and shape as to be adaptable to being placed on a dummy head with said cup-shaped windscreens overlying the location of the pinnas of said dummy head.

12. A stereo microphone apparatus as set forth in claim 11, in which said dummy head is mounted in a perforated box with said dummy pinnas facing opposite end walls and spaced therefrom.

13. A stereo microphone apparatus as set forth in claim 11, in which said cup-shaped windscreens are halved into front and back portions, each front half being formed as a semicup-shaped windscreen and each back half being formed as a semicup-shaped dummy pinna, the facing sides of said windscreens being in the form of a partially perforated disc in which said microphone is mounted.

14. A stereo microphone apparatus as set forth in claim 13, in which said windscreen, said mounting frame and said disc are integrally formed.

15. A stereo microphone apparatus as set forth in claim 11, in which said cup-shaped windscreens are halved into first and second portions, each first portion being formed as a semicup-shaped windscreen and each second portion being formed as semicup-shaped dummy pinna, the openings of said windscreens each containing a disc thereat in which said microphone is mounted.

* * * * *